United States Patent
Shida et al.

(10) Patent No.: US 12,088,880 B2
(45) Date of Patent: Sep. 10, 2024

(54) MOVIE DELIVERY APPARATUS, MOVIE DELIVERY METHOD, AND MOVIE DELIVERY PROGRAM

(71) Applicant: JVCKENWOOD Corporation, Yokohama (JP)

(72) Inventors: Raimu Shida, Yokohama (JP); Meisei Yasuda, Yokohama (JP); Satoaki Hashiguchi, Yokohama (JP); Kei Suzuki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/170,577

(22) Filed: Feb. 17, 2023

(65) Prior Publication Data

US 2023/0199252 A1 Jun. 22, 2023

Related U.S. Application Data

(63) Continuation of application No. PCT/JP2021/008147, filed on Mar. 3, 2021.

(30) Foreign Application Priority Data

Sep. 4, 2020 (JP) .................. 2020-148813

(51) Int. Cl.
*H04N 21/442* (2011.01)
*H04N 21/218* (2011.01)
*H04N 21/81* (2011.01)

(52) U.S. Cl.
CPC . *H04N 21/44218* (2013.01); *H04N 21/21805* (2013.01); *H04N 21/812* (2013.01)

(58) Field of Classification Search
CPC ................................ H04N 21/44218
See application file for complete search history.

(56) References Cited

U.S. PATENT DOCUMENTS

2013/0298158 A1* 11/2013 Conrad .................. G06Q 30/02
725/34
2020/0195988 A1* 6/2020 Zavesky ................ A63F 13/27

FOREIGN PATENT DOCUMENTS

JP 2002-344928 A 11/2002
JP 2005-339479 A 12/2005

OTHER PUBLICATIONS

International Search Report for the corresponding PCT Application No. PCT/JP2021/008147 mail Jun. 1, 2021, 4 pages.
International Preliminary Examination Report on Patentability (I) for corresponding PCT Application No. PCT/JP2021/008147 mailed Mar. 7, 2023, 8 pages.

* cited by examiner

*Primary Examiner* — Michael H Hong
(74) *Attorney, Agent, or Firm* — Shih IP Law Group, PLLC

(57) ABSTRACT

A viewer reaction acquisition unit acquires reactions of viewers of a movie. A reaction aggregating unit aggregates levels of the reactions of the viewers for each player or team supported by viewers. A display mode changing unit changes a display mode in accordance with the levels of the reactions for each player or team. A movie delivery unit delivers a movie for which the display mode is changed.

6 Claims, 6 Drawing Sheets

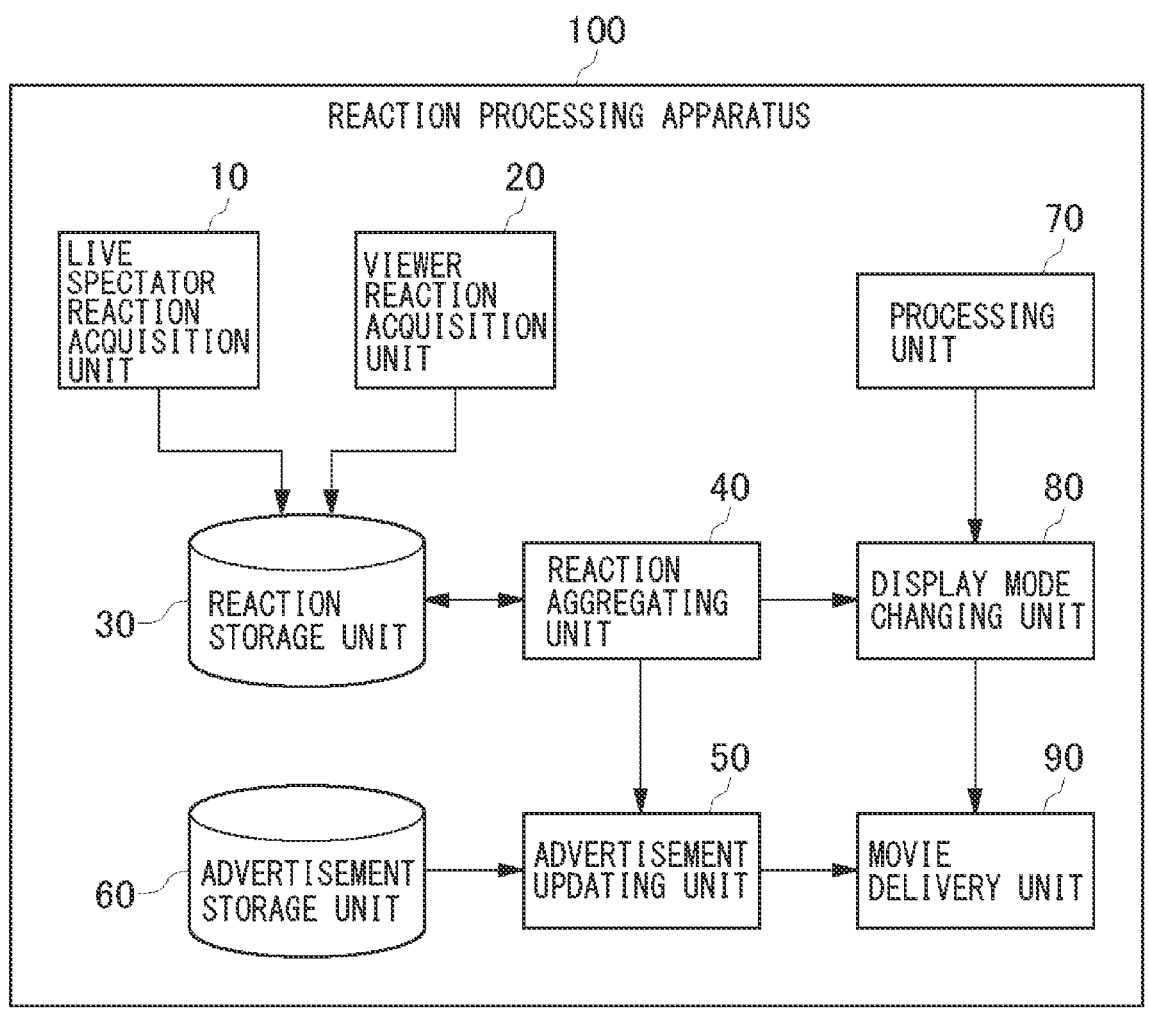

MOVIE DELIVERY APPARATUS, MOVIE DELIVERY METHOD, AND MOVIE DELIVERY PROGRAM

BACKGROUND OF THE INVENTION

1. Field of the Invention

The present invention relates to a movie delivery technology.

2. Description of the Related Art

Recently, electronic sports (e-sports) has become popular all over the world, and video game competitions of various categories are held. To enjoy e-sports, one may actually participate in a game and play the game or, as in ordinary sports, watch other players completing at a competition venue without participating in the game. In the case a competition of e-sports players is delivered by, for example, a movie delivery service of a sharing site on the Internet, a viewer at a remote location can watch a battle live on a movie delivery site.

Patent literature 1 discloses a system arranged to collect reactions made by viewers of a sports event or a concert broadcast on TV or on the web by using a terminal such as a remote controller, a personal computer, and a cell phone via the Internet in real time and reflecting the reactions at an event venue also in real time in the form of cheers or graphs.
[Patent literature 1] JP2005-339479

An issue associated with e-sports movie delivery sites is that, while it is possible to convey the excitement of live spectators to viewers of the movie delivery site by showing live spectators at an e-sports competition venue but it is not possible to visualize the excitement of viewers on the movie delivery site. Further, the system of patent literature 1 can reflect reactions of viewers in an event venue, but reactions of viewers are not shown in the movie delivery site.

SUMMARY OF THE INVENTION

The present invention addresses the above-described issue, and a purpose thereof is to reflect reactions of spectators.

A movie delivery apparatus according to an embodiment of the present invention includes: a viewer reaction acquisition unit that acquires reactions of viewers of a movie; a reaction aggregating unit that aggregates levels of the reactions of the viewers for each player or team supported by viewers; a display mode changing unit that changes a display mode in accordance with the levels of the reactions for each player or team; and a movie delivery unit that delivers a movie for which the display mode is changed.

The movie delivery apparatus may further include a live spectator reaction acquisition unit that acquires reactions of live spectators at a venue, wherein the reaction aggregating unit may aggregate levels of the reactions of the live spectators for each player or team supported by live spectators.

The display mode changing unit may apply an effect to a character of a player or team in accordance with the levels of the reactions for each player or a team.

The display mode changing unit may change a number of characters supporting the player or the team in accordance with the levels of the reactions for each player or a team.

Another embodiment of the present invention relates to a movie delivery method. The method includes: acquiring reactions of viewers of a movie; aggregating levels of the reactions of the viewers for each player or team supported by the viewer; changing a display mode in accordance with the levels of the reactions for each player or team; and delivering a movie for which the display mode is changed.

Optional combinations of the aforementioned constituting elements, and implementations of the disclosure in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 1 shows a configuration of a movie delivery apparatus according to an embodiment of the present invention;

FIG. 2 shows reactions values stored in the reaction storage unit of FIG. 1;

DETAILED DESCRIPTION OF THE INVENTION

Figure 3:
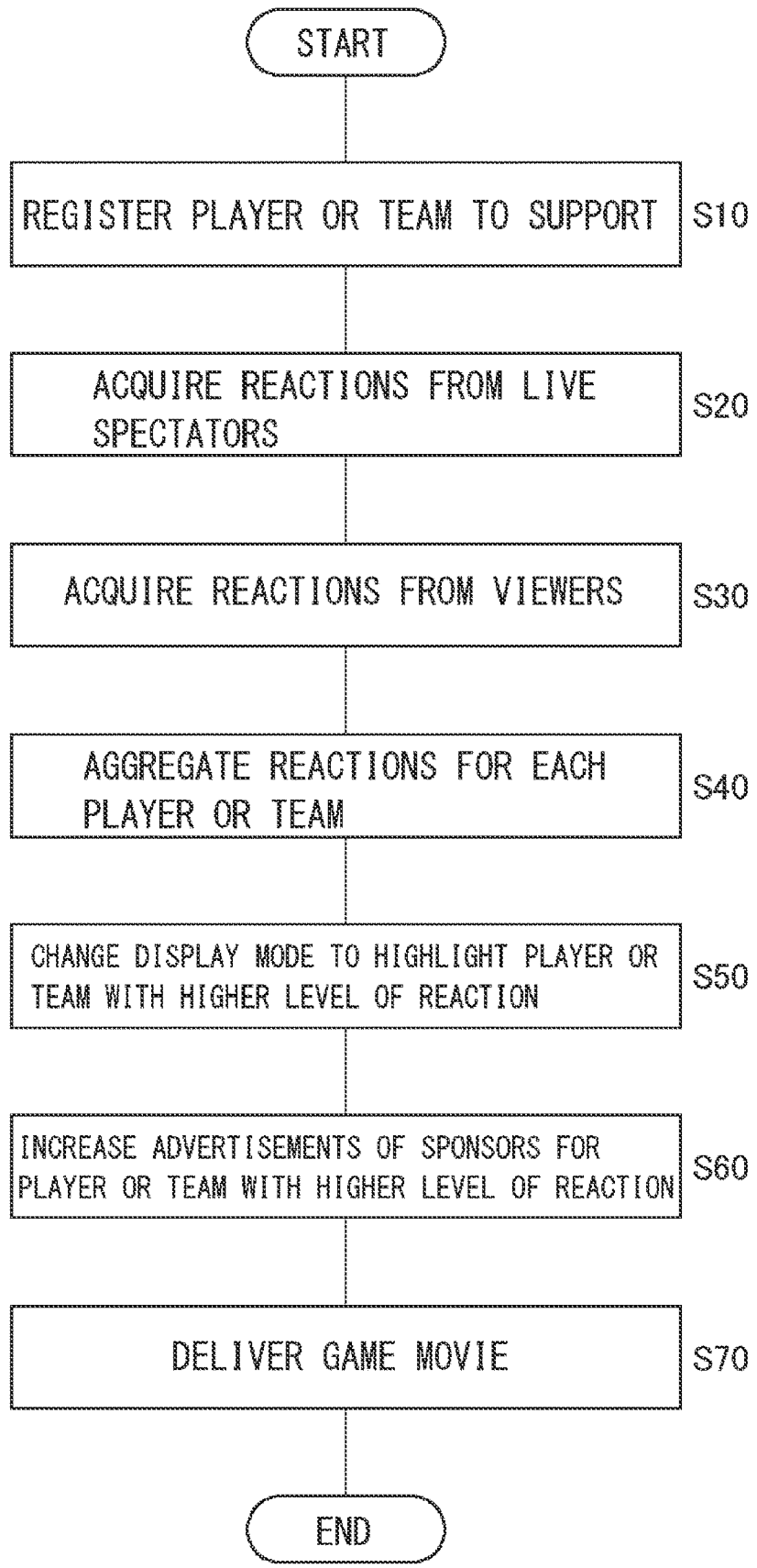
FIG. 3 is a flowchart showing a sequence executed by the movie delivery apparatus of FIG. 1 to deliver a game movie in which the reactions of spectators are reflected.

The invention will now be described by reference to the preferred embodiments. This does not intend to limit the scope of the present invention, but to exemplify the invention.

FIG. 1 shows a configuration of a movie delivery apparatus 100 according to an embodiment of the present invention. The movie delivery apparatus 100 includes a live spectator reaction acquisition unit 10, a viewer reaction acquisition unit 20, a reaction storage unit 30, a reaction aggregating unit 40, an advertisement updating unit 50, an advertisement storage unit 60, a processing unit 70, a display mode changing unit 80, and a movie delivery unit 90. The live spectator reaction acquisition unit 10, the viewer reaction acquisition unit 20, the reaction aggregating unit 40, the advertisement updating unit 50, the processing unit 70, the display mode changing unit 80, and the movie delivery unit 90 can be implemented by coordination of hardware resources and software resources or by hardware resources only. CPU, GPU, ROM, RAM, ASIC, FPGA, and other LSIs can be used as hardware resources. Programs such as operating system, middleware, and application can be used as software resources. Further, the reaction storage unit 30 and the advertisement storage unit 60 are, for example, a memory, a HDD, or an SSD.

Spectators of a battle game such as those of e-sports include live spectators at a game competition venue and viewers of a delivered game movie. A spectator registers which player or team of a battle game that the spectator supports in advance.

The live spectator reaction acquisition unit 10 acquires reactions of live spectators at a competition venue of the battle game. Reactions of live spectators include cheers, facial expressions, poses, etc. The live spectator reaction acquisition unit 10 digitizes the reactions of live spectators and stores reaction values in the reaction storage unit 30, mapping the player or the team supported by live spectators to the reaction values.

The viewer reaction acquisition unit 20 acquires reactions of viewers of a movie of the delivered battle game from the terminals of viewers via a network. Reactions of viewers include cheers, comments, clicks of a "good" button, etc. The viewer reaction acquisition unit 20 digitizes the reactions of viewers and stores reaction values in the reaction storage unit 30, mapping the player or the team supported by the viewers to the reaction values.

The reaction aggregating unit 40 aggregates the reaction values stored in the reaction storage unit 30 for each player or team. The reaction values may be aggregated for each player or team, breaking down the reaction values into those of live spectators and those of viewers. The total reaction values of the live spectators and the viewers may be aggregated for each player or team.

FIG. 2 shows reactions values stored in the reaction storage unit 30. Reaction values such as the number of comments, the number of clicks of "good", and the level of cheers are aggregated for each player or team and are stored. Hereinafter, a case in which player A and player B are in a battle will be described. Three types of reaction values including the number of comments, the number of clicks of "good", and the level of cheers of the spectators inclusive of the live spectators and the viewers are stored such that the reaction values are mapped to each of player A and player B. In this example, the total reaction values of live spectators and viewers are stored. Alternatively, the reaction values of live spectators and the reaction values of viewers may be stored separately.

The reaction aggregating unit 40 supplies the reaction value aggregated for each player or team to the advertisement updating unit 50 and the display mode changing unit 80.

The advertisement storage unit 60 stores an advertisement prepared by the sponsor for each player or team. The advertisement updating unit 50 changes the proportion at which an advertisement of the sponsor is displayed to update the advertisement that should be delivered, in accordance with the reaction value for each player or team supplied from the reaction aggregating unit 40. More specifically, the sponsor advertisement for a player or a team with a high reaction value is increased, and the sponsor advertisement for a player or a team with a low reaction value is decreased. The advertisement updating unit 50 supplies the updated advertisement to the movie delivery unit 90.

The processing unit 70 draws the game screen, updating the status of the character of the player or the team, in accordance with the progress of the battle game. and supplies the game screen to the display mode changing unit 80.

The display mode changing unit 80 changes the display mode of the game in accordance with the reaction value for each player or team supplied from the reaction aggregating unit 40. More specifically, the display mode such as the background of the game and the character is changed such that the higher the reaction value, the more noticeable the player or the team is. Alternatively, the viewpoint of the character of the player or the team with a high reaction value is selected to switch the viewpoint of the game screen.

The movie delivery unit 90 delivers the game movie for which the display mode is changed by the display mode changing unit 80 to the terminal of the viewer via the network along with the advertisement supplied from the advertisement updating unit 50.

FIG. 3 is a flowchart showing a sequence executed by the movie delivery apparatus 100 to deliver a game movie in which reactions of spectators are reflected.

The live spectator at a game venue and the viewer of a delivered game movie registers a player or a team that he or she supports (S10).

The live spectator reaction acquisition unit 10 acquires reactions to the battle game from the live spectators at a game venue and stores the reactions in the reaction storage unit 30 in association with the player or the team that the live spectators support (S20).

The viewer reaction acquisition unit 20 acquires reactions to the battle game from the viewers of a delivered game movie and stores the reactions in the reaction storage unit 30 in association with the player or the team that the viewers support (S30).

The reaction aggregating unit 40 aggregates the reactions for each player or team of the battle game and communicates the reactions to the advertisement updating unit 50 and the display mode changing unit 80 (S40).

The display mode changing unit 80 changes the display mode of the game such that the higher the level of reactions from spectators, the more the player or the team is highlighted (S50).

The advertisement updating unit 50 updates the advertisement delivered such that the higher the level of reactions from spectators, the larger the number of sponsor advertisement (S60).

The movie delivery unit 90 delivers the game movie for which the display mode is changed by the display mode changing unit 80 along with the advertisement updated by the advertisement updating unit 50 (S70).

Figure 4:
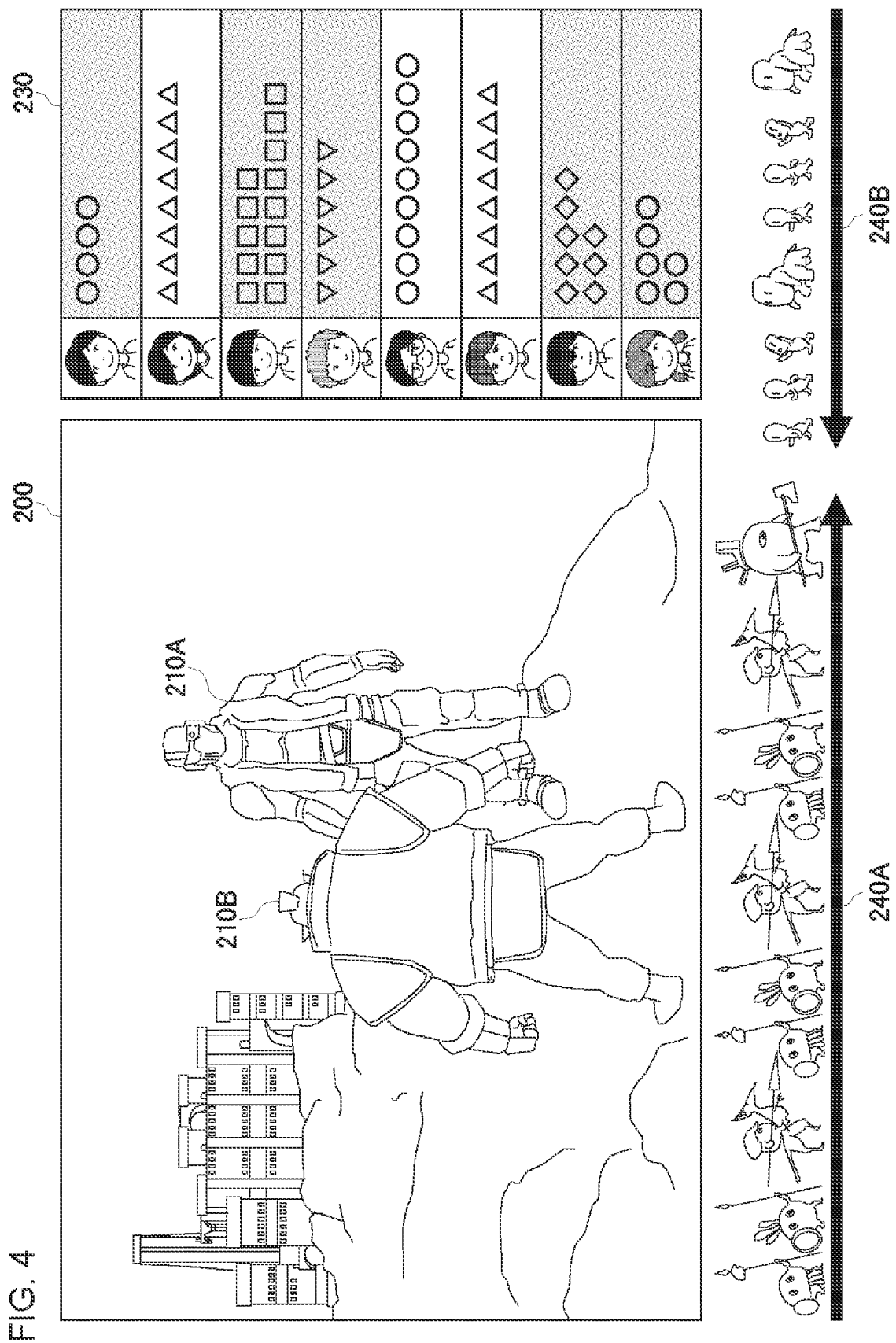
FIG. 4 illustrates a game movie displayed on the terminal of the viewer.

FIG. 4 illustrates a game screen displayed on the terminal of the viewer. In this example, the background of the seen is changed in the movie delivery site in accordance with how live spectators and viewers are excited.

A character 210A of player A and a character 210B of player B are drawn in a game screen 200. Comments of viewers supporting respective players are displayed in a comment field 230. In the comment field 230, the player or the team supported by the viewer is visually distinguished. For example, the color of a player or a team is defined, and a comment field is displayed in the color of the player or the team. This makes it possible to visually understand which player or team have attracted more comments. In this figure, comments of viewers supporting player A are hatched.

A cheering group 240A for player a and a cheering group 240B for plyer B are displayed in the lower part of the screen. A cheering group is comprised of mascot characters of the player or the team. The proportion between the number of people in the cheering group 240A for player A and the number of people in the cheering group 240B for player B reflects the proportion between the number of comments of viewers supporting player A and the number of comments of viewers supporting player B. In the case there are three or more players or teams, the proportion between the numbers of people in the cheering groups for the three or more players or teams may similarly be determined in accordance with proportion between the numbers of comments for the three or more players or teams.

In this case, the number of comments of viewers supporting player A is larger than the number of comments of viewers supporting player B so that the number of people in the cheering group 240A for player A is larger than the number of people in the cheering group 240B for player B.

The cheering group 240A for player A advances in the rightward direction, and the cheering group 240B for player B advances in the leftward direction. The cheering group 240A for player A, who is prevailing, pushes the cheering group 240B for player B, who is losing, toward the screen edge, as in push Sumo.

This enables visual presentation in which the mascot characters of the respective players or teams compete according to the total number of comments for each player or team, i.e., the total number of comments for each team since the start of the game up to now. Such presentation makes it possible to visually know which player or team is exciting people in the delivery site.

The proportion between the numbers of people in the cheering groups of the respective players or the teams is described above as being changed in accordance with the proportion between the numbers of comments input at the terminals by the viewers supporting the respective players or teams. Alternatively, proportion between the numbers of people in the cheering groups of the respective players or the teams may be changed in accordance with the proportion between the number of reviews such as clicks of "good" input by the viewers at the terminals. Further, in the case of a battle taking place at a game venue, not only the reactions of viewers but also the level of cheers of live spectators at the venue may be taken into consideration for each player or team to modify the proportion between the numbers of people in the cheering groups. For example, it is possible to determine how each player or team is exciting people in accordance with the volume of voice heard from the spectator sheets of each team.

Figure 5:
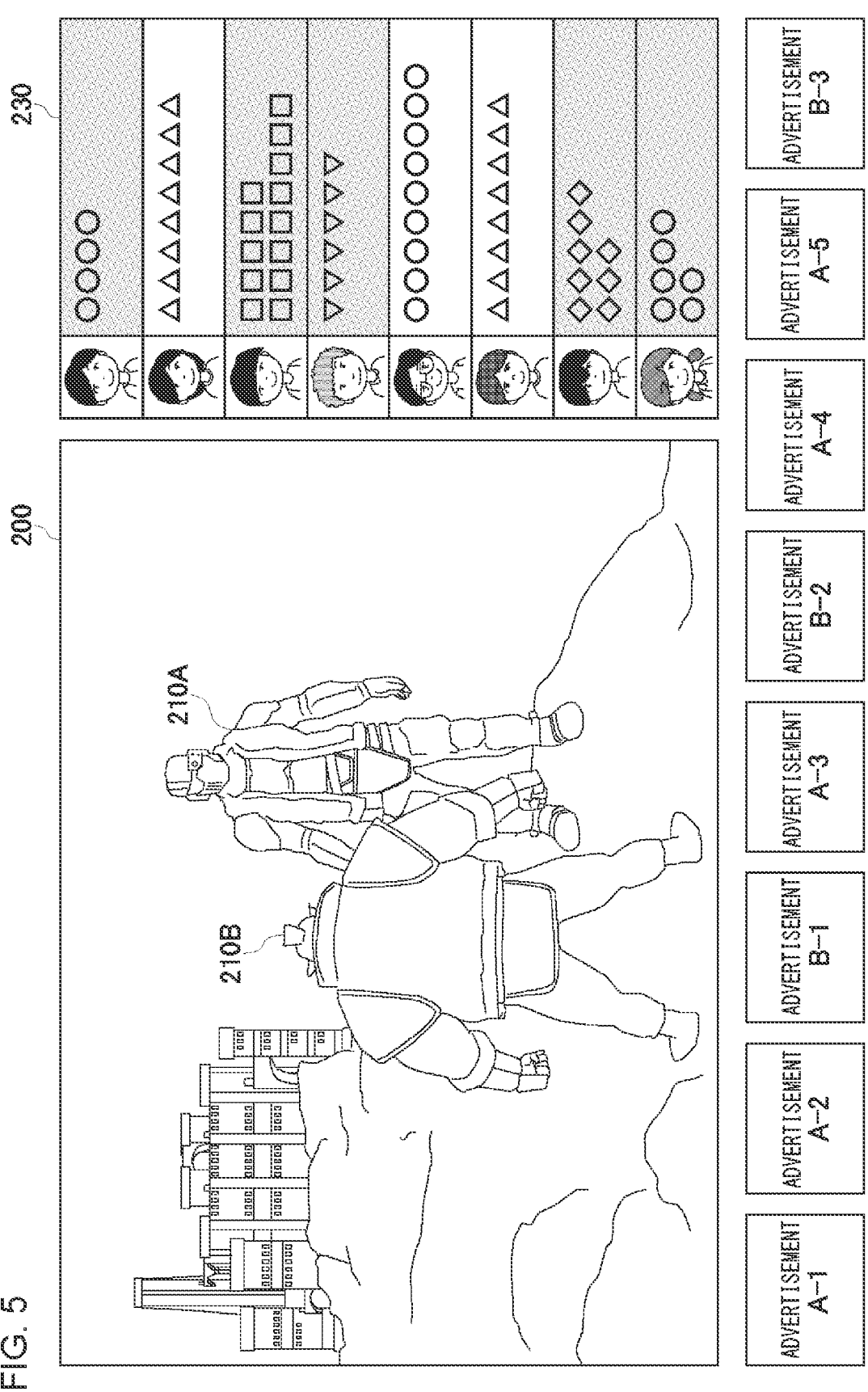
FIG. 5 illustrates a game movie and advertisements displayed on the terminal of the viewer.

FIG. 5 illustrates a game movie and advertisements displayed on the terminal of the viewer. Advertisement A-1, advertisement A-2, advertisement B-1, advertisement A-3, advertisement B-2, advertisement A-4, advertisement A-5, and advertisement B-3 are shown in the lower part of the screen. Advertisements A-1-A-5 are advertisements of the sponsor for player A, and advertisements B-1-B-3 are advertisements of the sponsor for player B.

In the delivery site, advertisements from the sponsors for the respective players or teams are displayed. The opportunities for displaying advertisements of the sponsor for the player or the team that is exciting people are increased based on the number of comments of viewers for the respective players or teams or the level of cheers of live spectators in the venue. In this case, the number of comments of viewers supporting player A is larger than the number of comments of viewers supporting player B so that a larger number of advertisements of the sponsor for player A are displayed than the advertisements of the sponsor for player B.

The display of sponsor advertisements may be updated when the excitement exceeds a certain criterion (e.g., when there are 1000 comments or more within one minute).

During the game, the more the player or the team is exciting people, the larger the number of their advertisements are displayed. When the battle is finally decided, however, a larger number of advertisements of the winning player or the team may be displayed.

FIG. 5 shows a case in which there are two players of the game. In the case there are three or more players or teams, the proportion at which the advertisements of the sponsors for the three or more players or teams are displayed may equally be determined in accordance with how the three or more players or teams are exciting people.

In this case, the sponsor advertisement is displayed in the lower part of the screen, but the sponsor advertisement may be displayed on the clothing worn by the character of each player or team in the game screen 200. In this case, the sponsor advertisement on the character of the player or the team who is prevailing may be displayed or frequently updated in accordance with how viewers and live spectators are excited. Sponsor advertisements may not be displayed on the character of the player or the team that is not exciting people so much.

Figure 6:
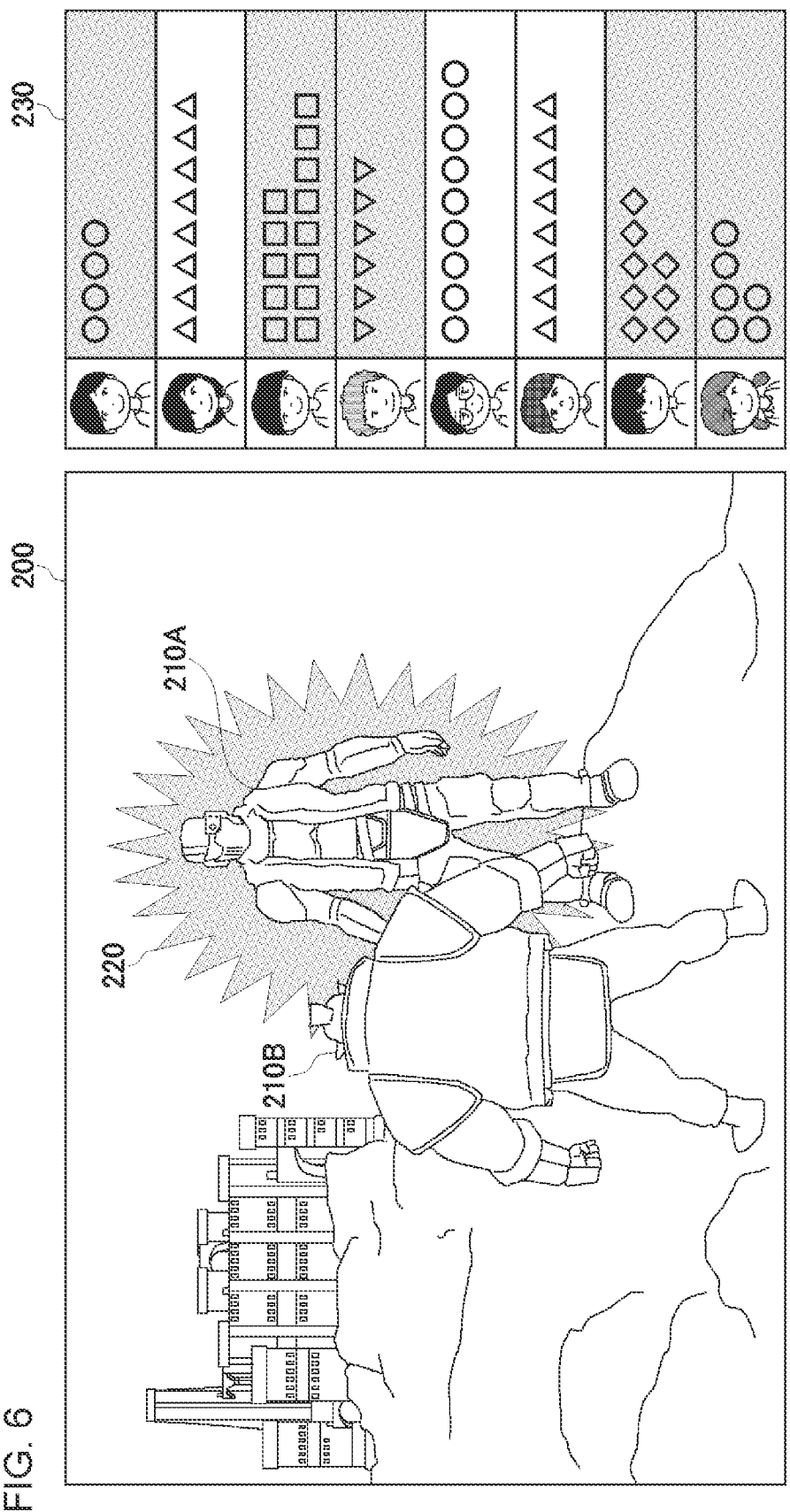
FIG. 6 illustrates a game movie displayed on the terminal of the viewer.

FIG. 6 illustrates a game screen displayed on the terminal of the viewer. In this example, an effect is applied to the character of the player or the team who is prevailing in accordance with how viewers and live spectators are excited. In this example, a presentation of giving an aura 220 to the character 210A of player A is shown by way of one example. By presenting comments of viewers and cheers of live spectators at the venue on the game, the player can know on the game that the player is being cheered by spectators. Further, the viewer can apply an effect to the character of the game in the delivery site. Therefore, affinity between viewers and affinity between viewers and the player can be enjoyed. By influencing the game in accordance with cheers and comments, viewers cease to be mere bystanders, and affinity with the player is increased by participating in the game.

Figure 7:
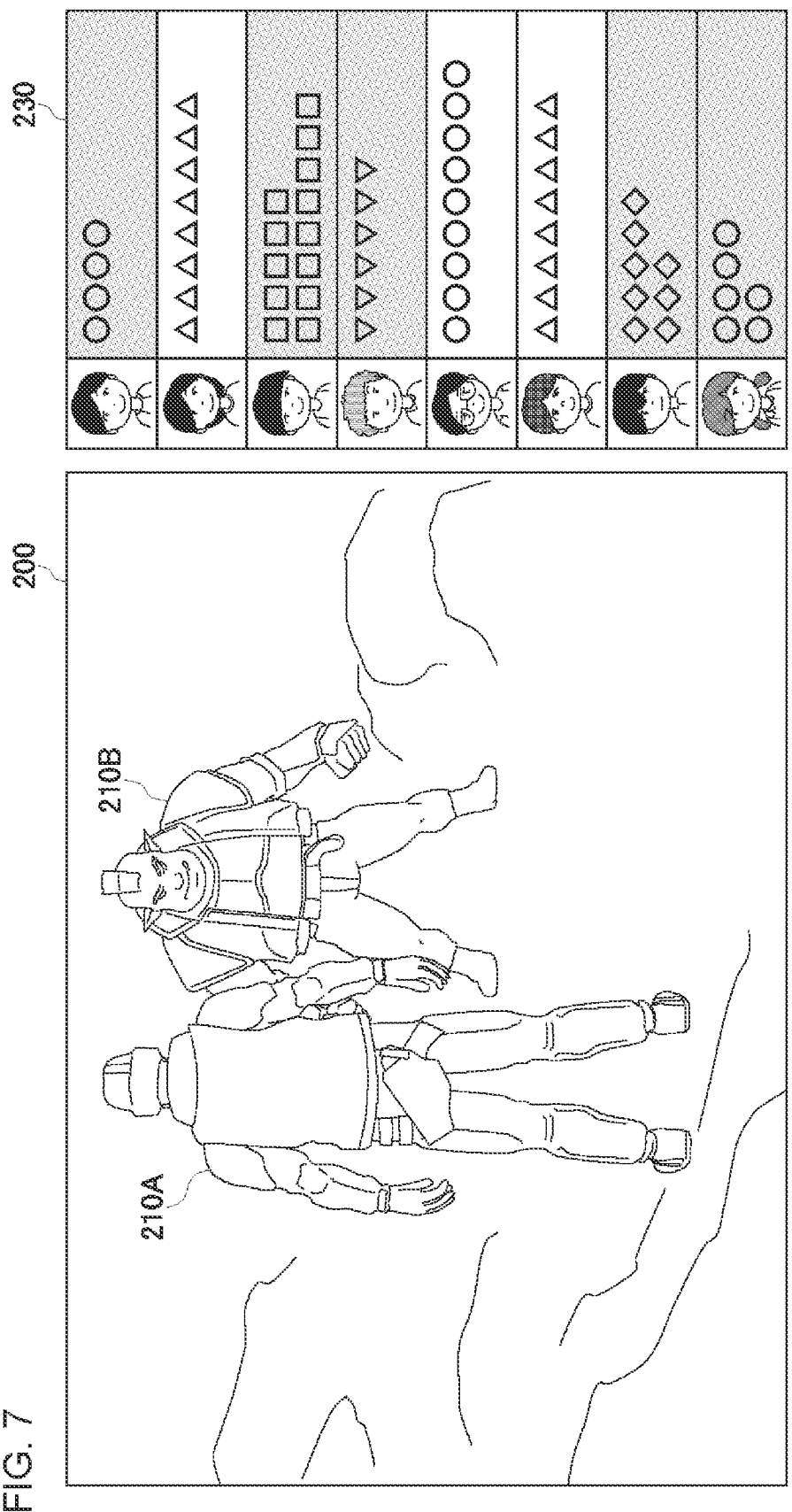
FIG. 7 illustrates a game movie displayed on the terminal of the viewer.

FIG. 7 illustrates a game movie displayed on the terminal of the viewer. In this example, the game movie is drawn from the viewpoint of the character of the player or the team that is exciting people. In this case, the number of comments of viewers supporting player A is larger than the number of comments of viewers supporting player B so that the game movie is drawn from the viewpoint of the character 210A of player A. Since it is possible to view a game movie by switching to the viewpoint of the player or the team that is exciting people, affinity between viewers/live spectators and the player can be increased.

As discussed above, game movies are described in the embodiment, but the invention is not limited to game movies. Any movie showing a player or a team is a target. The invention is also applicable to sports such as baseball and football.

The above-described various processes in the movie delivery apparatus 100 can of course be implemented by hardware-based apparatus such as a CPU and a memory and can also be implemented by firmware stored in a read-only memory (ROM), a flash memory, etc., or by software on a computer, etc. The firmware program or the software program may be made available on, for example, a computer readable recording medium. Alternatively, the program may be transmitted and received to and from a server via a wired or wireless network. Still alternatively, the program may be transmitted and received in the form of data broadcast over terrestrial or satellite digital broadcast systems.

As described above, according to the embodiment, excitement is visually conveyed to viewers so that affinity between viewers is increased, by presenting the game in such a manner to visualize the excitement of viewers viewing the battle game on the delivery site. Further, by reflecting the excitement of spectators including live spectators and viewers in the game screen, the excitement of spectators is conveyed to the player so that affinity between spectators and the player is increased.

Described above is an explanation based on an exemplary embodiment. The embodiment is intended to be illustrative only and it will be understood by those skilled in the art that various modifications to combinations of constituting elements and processes are possible and that such modifications are also within the scope of the present invention.

What is claimed is:

1. A movie delivery apparatus comprising:
 a viewer reaction acquisition unit that acquires reactions of viewers of a movie;
 a reaction aggregating unit that aggregates levels of the reactions of the viewers for each player or team supported by viewers;
 a display mode changing unit that changes a display mode in accordance with the levels of the reactions for each player or team; and
 a movie delivery unit that delivers a movie for which the display mode is changed,
 wherein the display mode changing unit applies an effect to a character of a player or a team who is prevailing in accordance with the levels of the reactions for each player or team.

2. The movie delivery apparatus according to claim 1, further comprising:
 an advertisement updating unit that changes a proportion of displaying an advertisement associated with a player or a team in accordance with a proportion between the levels of the reactions for respective players or teams and updates an advertisement that should be delivered, wherein
 the movie delivery unit delivers a movie for which the display mode is changed along with the advertisement that is updated.

3. The movie delivery apparatus according to claim 1, wherein
 the display mode changing unit selects a viewpoint of a character of a player or a team in accordance with the levels of the reactions for each player or team.

4. The movie delivery apparatus according to claim 1, wherein the effect applied to the character of the player or the team includes an aura given to the character of the player or the team.

5. A movie delivery method comprising:
 acquiring reactions of viewers of a movie;
 aggregating levels of the reactions of the viewers for each player or team supported by the viewer;
 changing a display mode in accordance with the levels of the reactions for each player or team; and
 delivering a movie for which the display mode is changed,
 wherein the changing the display mode includes applying an effect to a character of a player or a team who is prevailing in accordance with the levels of the reactions for each player or team.

6. A non-transitory computer-readable medium having a movie delivery program comprising computer-implemented modules including:
 a module that acquires reactions of viewers of a movie;
 a module that aggregates levels of the reactions of the viewers for each player or team supported by the viewer;
 a module that changes a display mode in accordance with the levels of the reactions for each player or team; and
 a module that delivers a movie for which the display mode is changed,
 wherein the module that changes the display mode applies an effect to a character of a player or a team who is prevailing in accordance with the levels of the reactions for each player or team.

* * * * *